US008229726B1

(12) United States Patent
Magdon-Ismail et al.

(10) Patent No.: US 8,229,726 B1
(45) Date of Patent: Jul. 24, 2012

(54) SYSTEM FOR APPLICATION LEVEL ANALYSIS OF HARDWARE SIMULATIONS

(75) Inventors: Tariq Magdon-Ismail, Santa Clara, CA (US); Razvan Cheveresan, Santa Clara, CA (US); Matthew D. Ramsay, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 620 days.

(21) Appl. No.: 11/544,341

(22) Filed: Oct. 5, 2006

(51) Int. Cl.
*G06F 9/455* (2006.01)
(52) U.S. Cl. .............. 703/20; 703/14; 703/22; 717/135
(58) Field of Classification Search .............. 703/21, 703/16, 14, 22; 715/771, 772; 714/33–39; 717/135
See application file for complete search history.

(56) References Cited

U.S. PATENT DOCUMENTS

| | | | | |
|---|---|---|---|---|
| 6,230,114 B1 * | 5/2001 | Hellestrand et al. | ............ | 703/13 |
| 6,263,303 B1 * | 7/2001 | Yu et al. | ............ | 703/19 |
| 6,425,762 B1 * | 7/2002 | Ernst | ............ | 434/29 |
| 6,763,452 B1 * | 7/2004 | Hohensee et al. | ............ | 712/227 |
| 6,973,417 B1 * | 12/2005 | Maxwell et al. | ............ | 703/2 |

OTHER PUBLICATIONS

Nogiec et al. "A Dynamically Reconfigurable Data Stream Processing System", Oct. 2004, Computing in High Energy Physics and Nuclear Physics 2004, pp. 429-432.*
Nogiec et al. "Configuring systems from components: the EMS approach", Jul. 2004, Nuclear Instruments & Methods in Physics Research, pp. 101-105.*

* cited by examiner

*Primary Examiner* — Kamini S Shah
*Assistant Examiner* — Hung Havan
(74) *Attorney, Agent, or Firm* — Martine Penilla Group, LLP

(57) ABSTRACT

An object-oriented software analysis framework is provided for enabling software engineers and hardware engineers to gain insight into the behavior of software applications on emerging hardware platforms even before the hardware is fabricated. In this analysis framework, simulation data containing instruction, address and/or hardware register information is sent to interchangeable and parameterizable analyzer and profiler modules that decode the data and perform analysis of the data according to each module's respective analysis function. This detailed analysis is performed by constructing a tree of such modules through which the data travels and is classified and analyzed or filtered at each level of the tree. Each node of the tree is represented by an analyzer or a profiler module that performs sub-analysis based on the analysis performed by its parent such that at the end of a hardware simulation, each node, starting at the root, recursively calls on its children to dump their analysis, resulting in a categorized performance report.

19 Claims, 13 Drawing Sheets

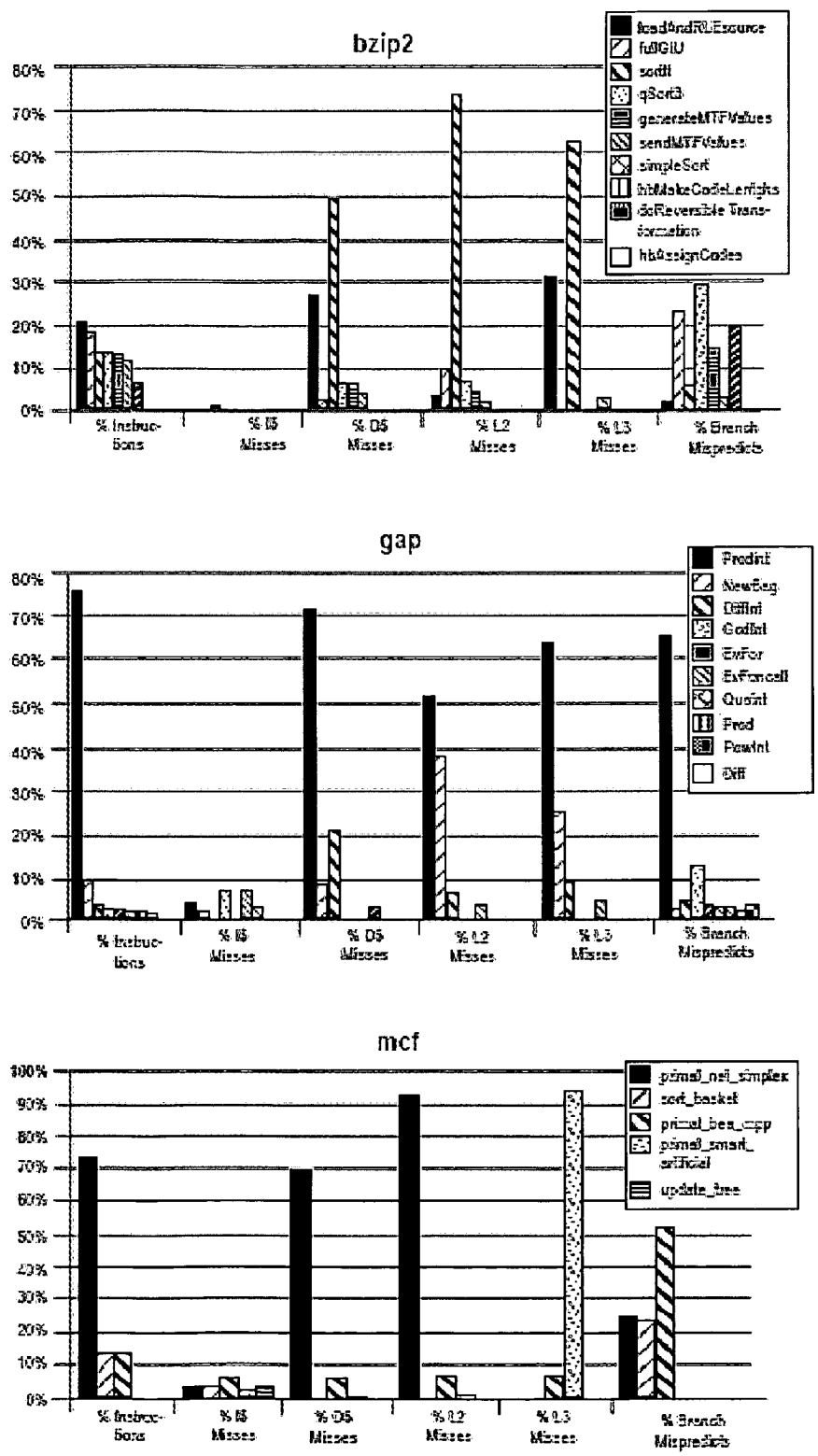
FIG. 6B-A

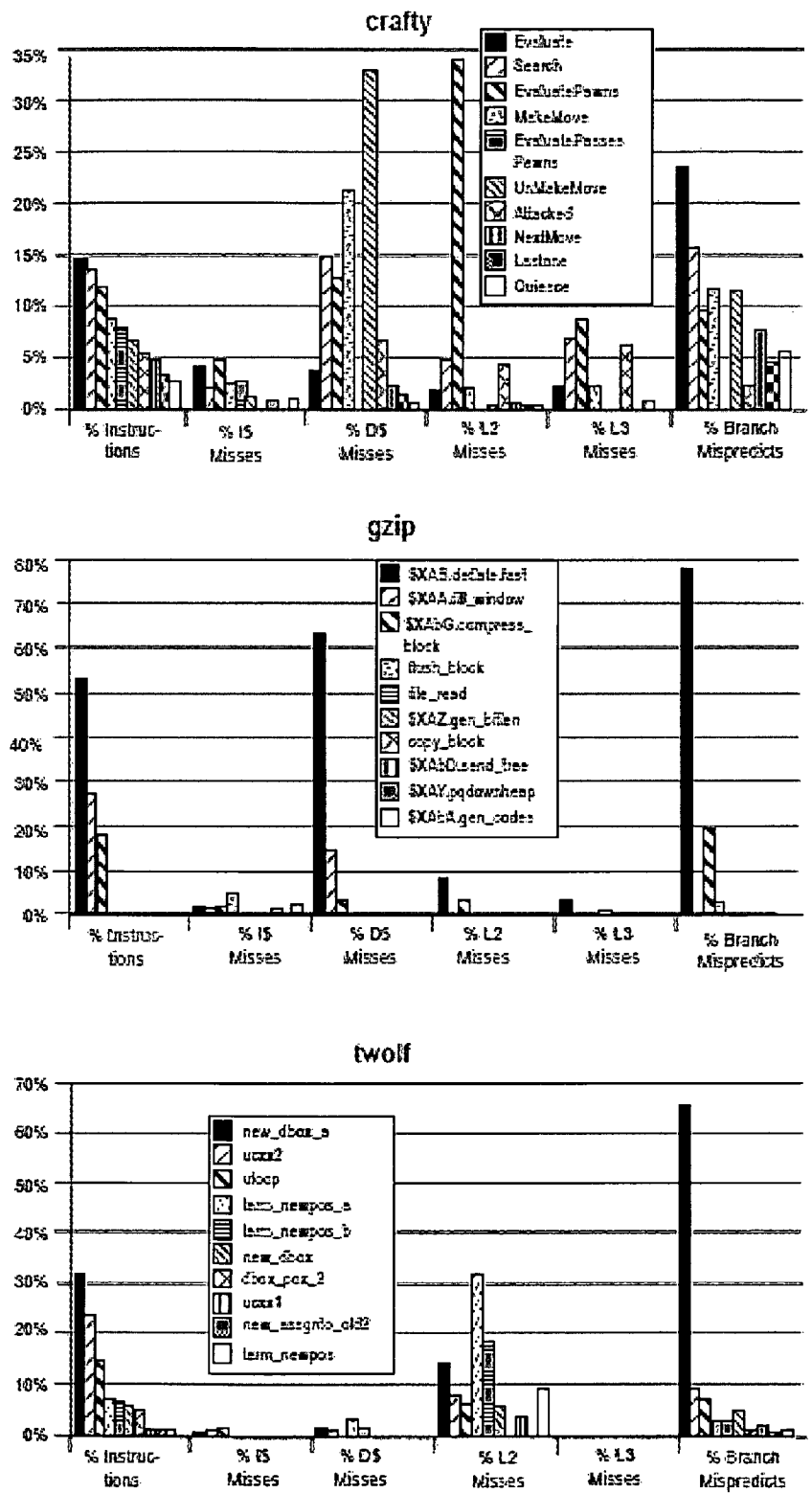
FIG. 6B-B

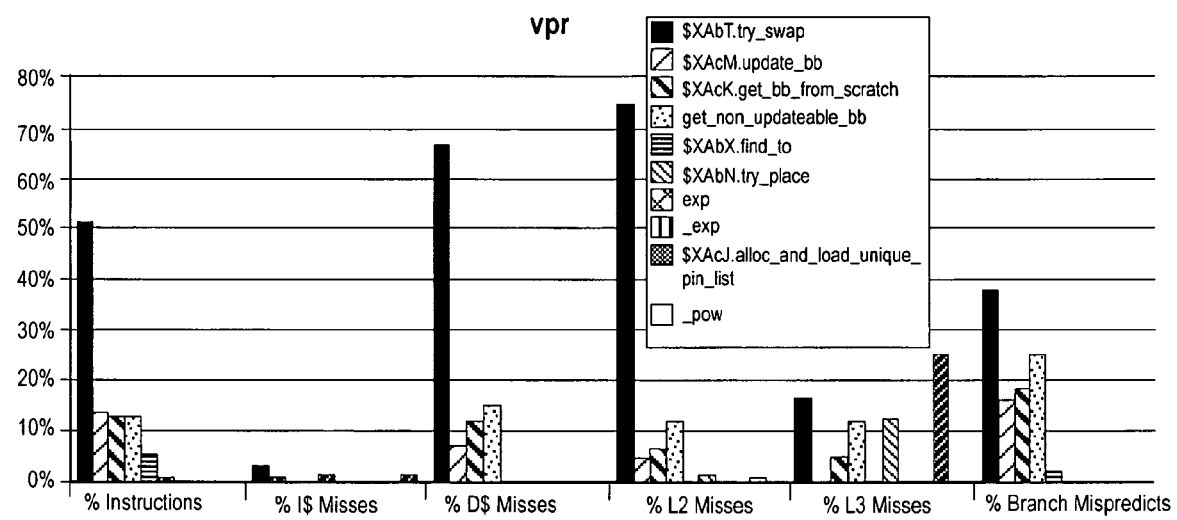
FIG. 6B-C

SYSTEM FOR APPLICATION LEVEL ANALYSIS OF HARDWARE SIMULATIONS

BACKGROUND

1. Field of the Invention

The invention relates generally to workload analysis, and more particularly, to systems and methods for providing software application-level workload analysis of simulated hardware systems.

2. Description of the Related Art

The design of future microprocessors and system architectures etc. relies heavily on an ability to reliably evaluate and analyze the workload performance for proposed microprocessors and system architectures before they are built. Although significant work has been done to analyze and profile workload performance through software code inspection and measurement on existing hardware systems, such work is primarily focused on correlating the resulting workload performance data to software application performance on the existing hardware systems and on extrapolating the performance data obtained from the existing hardware systems to anticipate the performance of future hardware systems. On the other hand, little work has been done to facilitate software analysis in performance simulation environments for emerging microprocessors and system architectures etc. not yet built. For example, currently it is difficult to identify the software application functions responsible for most of the TLB (Translation Look-aside Buffer) misses for a simulated hardware system or to relate software application memory segments to cache interface patterns.

This inability to adequately perform application-level analysis of emerging hardware simulations is also due, in part, to the segregation of application performance expertise and hardware simulation expertise in system architecture design environments. More particularly, the tools that are used to facilitate performance workload analysis and the tools that are used to facilitate hardware simulation are typically used in isolation, resulting in a technical barrier to opportunities to cross-leverage knowledge. For instance, there are many tools to analyze workload instruction traces, but none which offer the flexibility to run dynamically without modification in the multiple stages of a trace-driven or execution-driven etc. hardware performance simulation of emerging architectures. Consequently, architects are often provided with workload analysis data that is specific to current hardware systems and the architects are left to extrapolate this workload analysis data obtained from a current hardware system to design a future, emerging, or new hardware system, a process that is inherently prone to error. Moreover, for workload analysis engineers to leverage existing tools against new types of analysis, it is necessary for the engineers to understand the source code and the structure of the existing tools in order to expand the tools to different applications. And, since these existing tools are typically architecture or simulator specific and complex, most engineers chose to develop new tools rather than extend existing tools, which results in duplication of work and correspondingly slowed analysis feedback.

In view of the forgoing, there is a need for providing an infrastructure for enabling software engineers and hardware engineers to gain insight into the behavior of software applications on future hardware platforms prior to the actual fabrication of hardware platforms, thereby reducing the need to extrapolate software performance characteristics from existing hardware product generations to products that are yet to be developed.

SUMMARY

In one embodiment, the present invention provides a computer system for performing application-level analysis of simulated hardware. The computer system comprises a hardware simulation, wherein the hardware simulator is capable of executing software on the simulated hardware and intercepting the interactions between the software and the simulated hardware. The computer system also comprises a framework, wherein the framework includes a plurality of analysis modules arranged in a multi-level configuration through which a data stream of one or more data entities corresponding to the interactions between the software and the simulated hardware travels and is processed at each level of the multi-level configuration.

In another embodiment, the present invention provides a method for enabling a computer system to perform application-level analysis of simulated hardware. The method comprises executing software on the simulated hardware using a hardware simulator and intercepting the interactions between the software and the simulated hardware. The method also comprises receiving a data stream of one or more data entities corresponding to the interactions between the software and the simulated hardware at the framework, the framework including a plurality of analysis modules arranged in a multi-level configuration. The method further comprises processing the one or more data entities, at each level of the multi-level configuration, using the plurality of analysis modules as the data stream travels through the multi-level configuration.

In yet another embodiment, the present invention provides a computer-readable medium for directing a computer system to perform application-level analysis of real or simulated hardware. The computer-readable medium comprises instructions for receiving the data stream of one or more data entities corresponding to interactions between software and the simulated hardware at a framework where the framework includes a plurality of analysis modules arranged in a multi-level configuration. The computer-readable medium also comprises instruction for processing the one or more data entities, at each level of the multi-level configuration, using the plurality of analysis modules as the data stream travels through the multi-level configuration.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which:

FIG. 6B is an illustration of an exemplary characterization of the function-level pipeline analysis data produced by the system illustrated in FIG. 6A, in accordance with an embodiment of the present invention;

DETAILED DESCRIPTION

Embodiments of the present invention provide a workload analysis framework that enables software engineers and hardware engineers to gain insight into the behavior of software applications on emerging chips and system architectures etc. before such chips and system architectures are built. The workload analysis framework of embodiments of the present invention reduces the need to extrapolate software performance characteristics from existing hardware product generations onto developing hardware architectures because analysis data can easily be collected directly from the simulation of developing hardware architectures, which significantly shortens software and hardware design improvement cycles. More particularly, the workload analysis framework of embodiments of the present invention is an object-oriented analysis framework that is architected in a modular manner to allow a broad range of flexible analysis to be performed with the development of only a handful of analysis modules. The workload analysis framework of embodiments of the present invention is designed to be fully compatible for use with trace-driven or execution-driven (live) cycle-accurate etc. hardware simulators written for emerging or new chip and system architectures, and with software and hardware instruments of real (non-simulated) systems. As a result, new users need only understand individually relevant portions of the framework's structure and source code to both use and extend the toolset associated with the framework.

Figure 1:
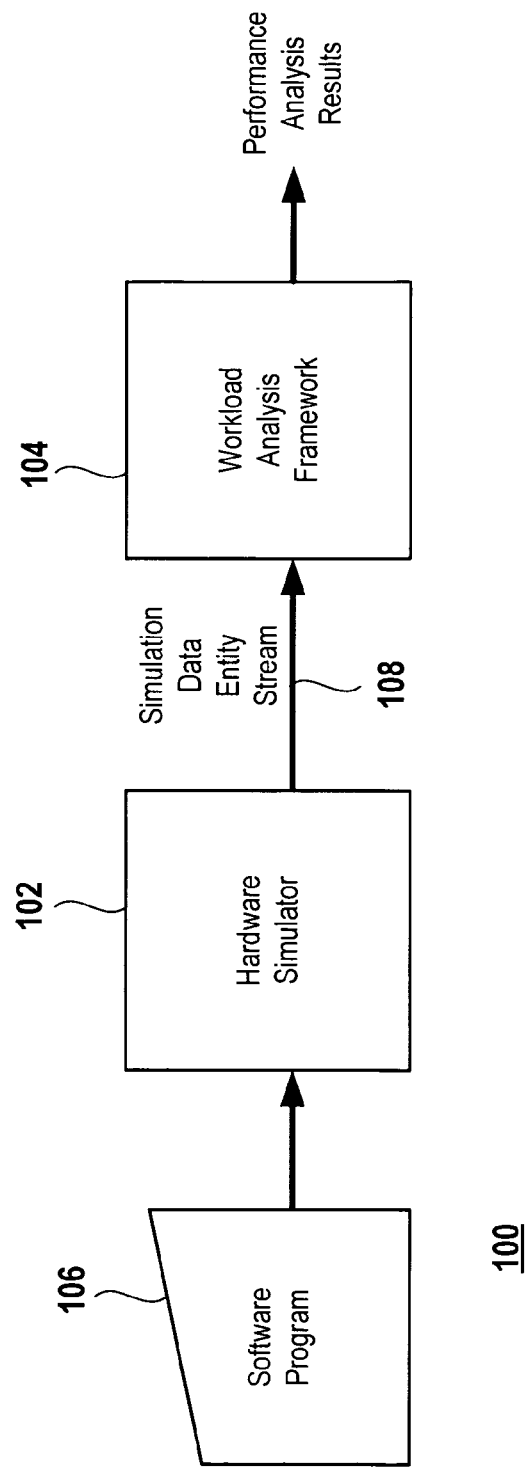
FIG. 1 is an illustration of a system for application-level analysis of a hardware simulation, in accordance with an embodiment of the present invention.

In FIG. 1, is an illustration of a System 100 for analyzing the performance of a future hardware system that includes a software-based Hardware Performance Simulator 102 and a Workload Analysis Framework 104. In one embodiment of the present invention, as discussed in more detail below regarding FIG. 5A, the Hardware Performance Simulator 102 can be a trace-driven (e.g. functional) simulator that executes a Software Program 106 and outputs a trace of entities that include instructions, records, bus transactions, direct memory access (DMA) requests, interrupts, network packets, etc. executed during the hardware simulation. The outputs of the trace can then be sent to the Workload Analysis Framework 104 as an Entity Stream 108 of simulation data where analysis modules of the Workload Analysis Framework 104 can decode each entity of the Entity Stream 108 and perform analysis or filter functions on information contained in the Entity Stream 108 to produce application-level performance analysis data for an emerging hardware system.

In another embodiment of the present invention, as discussed in more detail below regarding FIG. 6A, one or more instances of a Workload Analysis Framework 104 can be plugged in to a "live simulation" performed by an execution-driven (e.g., performance) Hardware Simulator 102 where, again, analysis modules of each instance of the Workload Analysis Framework 104 perform analysis or filter functions on the Entity Stream 108 generated at various stages of the "live simulation" to produce application-level performance analysis data for an emerging hardware system.

Referring still to FIG. 1, in an alternate embodiment of the present invention, the Workload Analysis Framework 104 can be used with a Hardware Simulator 102 that is capable of running in both trace-driven and execution-driven modes, or with any other type of hardware simulator that is capable of simulating emerging hardware architecture. In further alternate embodiments of the present invention, software tools (not shown) or hardware instrumentation devices (not shown) can replace the Hardware Simulator 102. Specifically, in one embodiment, the Workload Analysis Framework 104 can be integrated with one or more software tools that instrument real hardware by intercepting interactions (events) between software and hardware, and create a stream of Data Entities 108 for each instrumented event. And, in another embodiment, the Workload Analysis Framework 104 can be used with one or more hardware instrumentation devices (not shown) that are capable of providing a trace of hardware events. These hardware events can be used to create a stream of Data Entities 108 for analysis of the software running on the real hardware.

Figure 2:
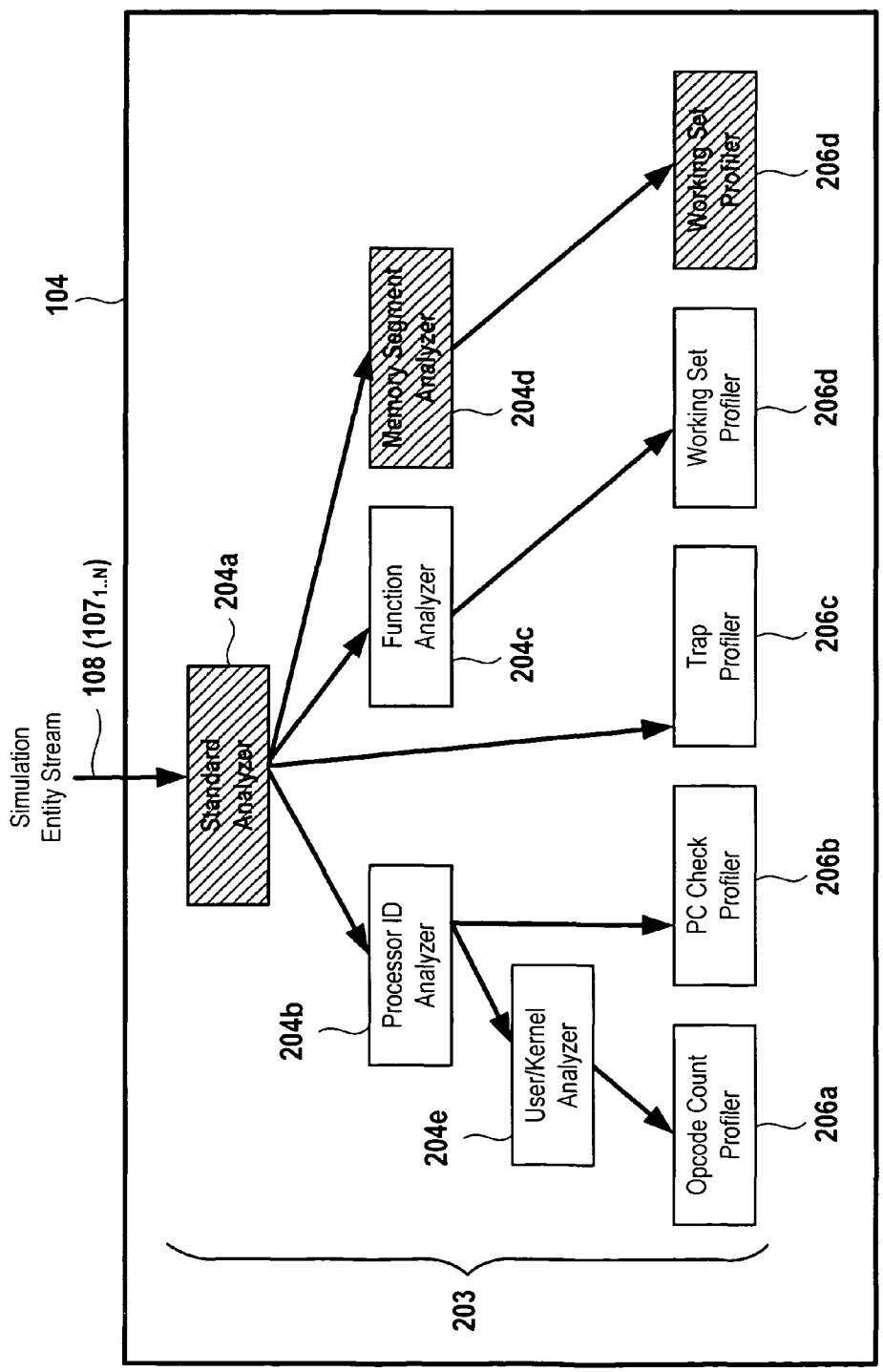
FIG. 2 is an illustration of an exemplary analysis tree of a workload analysis framework, in accordance with an embodiment of the present invention.

In FIG. 2, in one embodiment of the present invention, the Workload Analysis Framework 104 is an object-oriented software analysis framework that includes interchangeable analysis modules that are configured in a multi-level functional configuration tree-like structure to perform the application-level performance analysis for an emerging hardware system. The Workload Analysis Framework 104 of an embodiment of the present invention, is capable of performing detailed application-level analysis on an emerging hardware system by constructing an Analysis Tree 203 of interchangeable analysis modules (204, 206) through which live or trace etc. simulation data, Entity Stream 108, travels and is classified and analyzed or is filtered at each level of the Analysis Tree 203. Specifically, each node of the Analysis tree is represented by an analysis module (204, 206) that performs sub-analysis based on the classification performed by its parent. And, as the Entity Stream 108 data travels through an analysis module (204, 206), the module (204, 206) can add information objects to the Entity Stream 108 data for reference or analysis further down the analysis chain. At the end of a simulation, each node starting at the "root" node, can recursively call on its children to dump their analysis to produce a categorized analysis report that contains all of the performance analysis data results for a targeted hardware system.

In one embodiment of the present invention, the infrastructure of the Workload Analysis Framework 104 illustrated in FIG. 2 includes two primary categories of analysis modules, Analyzers 204 and Profilers 206, which represent the foundation of any Analysis Tree 203. Profilers 206, discussed in more detail below, can be "leaf" modules that collect data on different events seen in the Entity Stream 108. Analyzers 204, also discussed in more detail below, can be specialized "non-leaf" modules that, like Profilers 206, can collect data on different events seen in the Entity Stream 108, but are also capable of classifying, annotating, or transforming the simulation data of the Entity Stream 108 for analysis by lower-level analysis modules. In contrast, as shown in FIG. 2, Analyzer modules 204 can be connected to other Analyzer modules 204 to classify an Entity Stream 108 further, or connected to Profiler modules 206 to perform backend analysis. For example, the left-most analysis branch of the Analysis Tree 203 illustrated in FIG. 2, which includes a Standard Analyzer 204a, a Processor ID Analyzer 204b, a User/Kernel Analyzer 204e, and an Opcode Count Profiler 206a, is capable of producing one opcode count summary table for both user and kernel instructions for each processor identified in the Entity Stream 108.

As previously mentioned, Analyzers 204, can be specialized "non-leaf" modules that are capable of classifying, annotating, or transforming simulation Data 108 for analysis by lower-level modules. Specifically, in one embodiment of the present invention, Analyzers 204 are capable of dividing a stream of Data 108 into sub-streams of data to be analyzed separately by Analyzer 204 or Profiler 206 modules lower in the Analysis Tree 203. As classifiers, in one embodiment, an Analyzer module 204 can split the Entity Stream 108 into sub-streams classifications based on characteristics that include, for example, software thread ID, CPU ID, function, memory segment, etc., so that successive analysis can be automatically performed based on a particular classification or characteristic of the Data 108. According to one embodiment of the present invention, as discussed in more detail in FIG. 4, the Analyzer module 204 is also capable of annotating a data entity of the Entity Stream 108 with additional information that can be utilized by analysis modules further down the analysis chain. For example, a Function Analyzer module, discussed in detail below, can annotate incoming Data Entities 107 (not shown) of the Entity Stream 108 with the software application function that the entities of the Entity Stream 108 correspond to so that the software function can be identified by other analysis modules (204, 206) without having to re-execute the entity-to-function mapping. In one embodiment of the present invention, the Analyzer module 204 is further capable of transforming the Entity Stream 108 by overwriting fields of a Data Entity 107 (not shown) or by substituting or adding new fields in a Data Entity 107. For example, a Data Entity 107 created from a memory access instruction in simulation can contain fields such as the context ID, instruction executed, virtual memory address accessed, physical memory accessed etc. And a Physical Memory Mapping Analyzer module, discussed in more detail below, may dynamically change the value of the address field to reflect a newer memory mapping policy under study, resulting in lower level analysis being performed with the new mappings. Further, the Physical Memory Mapping Analyzer module can attach a new field, such as memory domain etc., to the list of fields in the Data Entity 107 for lower level analysis.

Moreover, in one embodiment of the present invention, the Workload Analysis Framework 104 can include a set of "built-in" Analyzer modules 204 and "built-in" Profiler modules 206 that can be utilized in any combination based on the desired analysis. For example, in one embodiment of the present invention, a set of built-in Analyzer modules 204 can include, but is not limited to:

A Standard Analyzer that is a generic analysis module that can be used in experiments where there is no need to divide the simulation Data 108 into different categories. For example, the Standard Analyzer is capable of profiling the total number of traps seen in an instruction trace or the total number of instructions fetched by all of the processors in a cycle accurate simulator. The Standard Analyzer can also be used as a "root" node of an Analysis Tree 203 when the desired analysis requires the use of multiple additional analysis modules in parallel (e.g. Process ID Analyzer, Function Analyzer, Memory Segment Analyzer), as shown in FIG. 2;

A Processor ID Analyzer that is capable of decoding information in the stream of Data 108 and categorizing entities of the Data 108 by processor ID. The Processor ID Analyzer can be particularly useful in the analysis of multiprocessor hardware systems;

A Software Thread Analyzer that is capable of decoding the register information in the Entity Stream 108 and classifying the information in the data in the Entity Stream 108 by software thread ID. It is worth noting that the Software Thread Analyzer is different from the Processor ID Analyzer in that the Software Thread Analyzer is capable of analyzing multi-threaded software programs;

A User/Kernel Analyzer that is capable of decoding the Entity Stream 108 and dividing it into sub-streams depending on whether and a Data Entity 107 of the Entity Stream 108 corresponds to user or kernel instruction activity, which makes the User/Kernel Analyzer useful in determining the amount of operating system kernel activity that occurs during a workload's execution or in characterizing user code after all kernel activity has been filtered out;

A Memory Segment Analyzer that is capable of categorizing Data Entities 107 in the Entity Stream 108 based on which virtual memory segments (e.g., stack, heap, text, data, library, etc.) the Data Entities 107 references. The Memory Segment Analyzer can provide a way of relating various events, like cache misses and translation look-aside buffer (TLB) misses etc., to the application memory segment responsible for causing the misses etc. In one embodiment, the Memory Segment Analyzer utilizes a configuration file that contains the process virtual address segment mappings for all active processes on a simulated machine from which a trace etc. is derived to identify the segment access by a particular instruction; and A Function Analyzer that is capable of decoding the address information in the Data 108 and categorizing the decoded data based on which source code function the address information maps to. The Function Analyzer offers a powerful way of mapping various events encountered in the execution (e.g. cache misses, TLB misses, branch mispredicts) to the application function responsible for causing the event. In one embodiment of the present invention, the Function Analyzer is capable of using a configuration file that includes application symbol table information and mapping each source code function to a virtual address range on the simulated machine and associating instructions in the trace etc. with those functions.

As previously mentioned, Profiler modules 206, in one embodiment of the present invention, can be "leaf" modules that collect data on different events seen in the Entity Stream 108, as illustrated in FIG. 2. Specifically, Profiler modules 206 form the leaves of an Analysis Tree 203, and can be responsible for counting and/or profiling the Entity Stream 108 passed down by the Analyzer modules 204. Unlike Analyzers 204, in one embodiment of the present invention, Profilers 206 are not chained to other Profilers 206, but instead are connected to a parent Analyzer module 204. In one embodiment of the present invention, a Profiler 206 can be as simple as an event counter. However, according to embodiments of the present invention, a Profiler's 206 utility increases significantly when the Profiler 206 is connected with different Analyzers 204 to form the Analysis Tree 203. In other words, a simple Profiler 206 can be plugged into any combination of Analyzers 204 to generate a wide range of information within the same simulation without requiring any modifications to the Profiler 206 or Analyzers 204. For example, as shown in FIG. 2, a Working Set Profiler module 206*d*, whose purpose it is to characterize the working sets of the processes represented in the Entity Stream 108, can be plugged into a Function Analyzer module 204*c* and a Memory Segment Analyzer module 204*d* to report working set growth on a per application function and per memory segment basis within the same hardware simulation.

In one embodiment of the present invention, the Workload Analysis Framework 104 can include a set of built-in Profilers 206 that can be utilized with any combination of Analyzers 204 depending upon the particular requirements of the analysis being performed. This set of built-in Profilers 206 can include, but is not limited to:

An Instruction Frequency Profiler that can decode each machine instruction in the Entity Stream 108 and report the number of instructions that fall into any number of broad categories including memops, branches, trapped instructions, arithmetic logic unit (ALU) instructions, no-ops, etc.;

An Opcode Count Profiler that can decode each machine instruction in the stream of Data 108 and count the occurrence of each opcode.

A Trap Profiler that can count and categorize each type of trap encountered in the Entity Stream 108;

A Working Set Profiler that can decode the effective address information of each machine instruction encountered in the sequence of instructions identified in the Data 108 and report information about the growth of a working set over a period of time for the sequence of instructions;

A Memory Stride Profiler that can decode each machine instruction encountered in the Entity Stream 108 and report a histogram summary of the distance between consecutive instructions and data memory accesses;

A Load/Store Transition Profiler that can identify each memory operation encountered in the Entity Stream 108 and report a summary transition table (i.e. percentage of loads followed by a store, percentage of stores followed by another store, etc., and so on);

A Memory Reuse Profiler that can identify each memory operation encountered in the Entity Stream 108 and report a histogram summary of the number of machine instructions between accesses to the same memory location (i.e. temporal locality);

A Context Switch Profiler that can identify changes in the memory management unit (MMU) context of the Entity Stream 108 and report a summary of machine instructions seen on a per context switch basis; and A Program Counter (PC) Check Profiler that can ensure that the Entity Stream 108 represents a legal SPARC™ (Scalable Processor Architecture) instruction sequence. The PC Check Profiler can check for legal PC sequences around branches, delay slots, traps, interrupts, etc. and report a corresponding error summary. In one embodiment of the present invention, the PC Check Profiler can be used as a child of the Processor ID Analyzer discussed above.

Figure 3A:
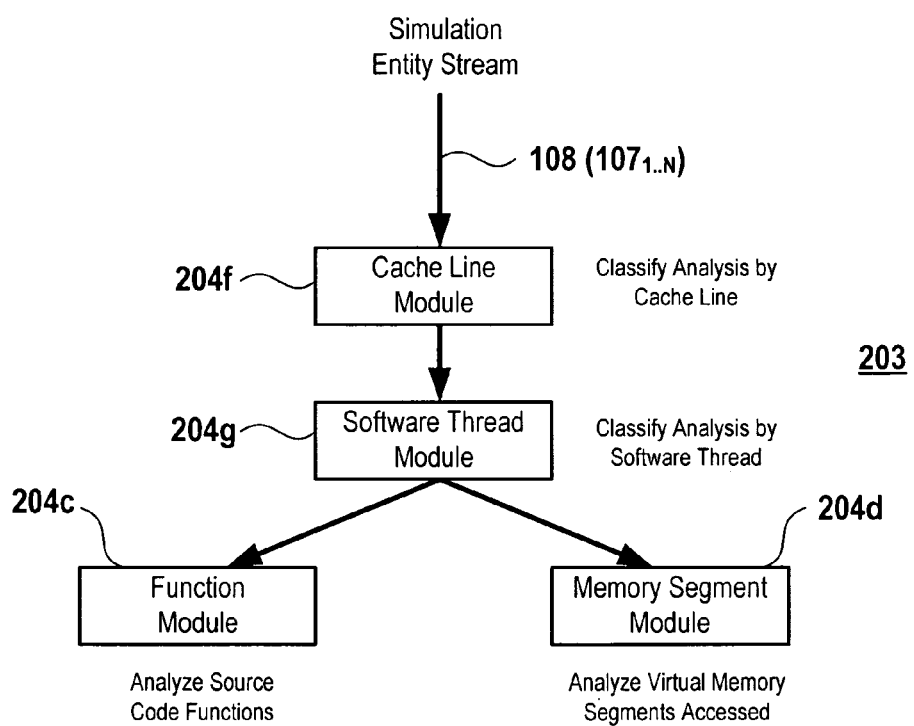
FIG. 3A is an illustration of an exemplary analyzer module configuration for analyzing cache misses in a hardware simulation, in accordance with an embodiment of the present invention.

In FIG. 3, additional exemplary illustrations of Analysis Trees 203 according to embodiments of the present invention are shown. However, similar to the illustration provided above in FIG. 2, the FIG. 3 illustrations are provided for illustrative purposes only and are not meant to limit the scope of embodiments of the present invention. For example, in FIG. 3A, an illustration of a Analyzer module 204 configuration that can be used to analyze cache misses is shown. Specifically, Data Entities 107 of the Entity Stream 108 which are created during cache miss events in a hardware simulation are passed to a custom Cache Line Analyzer module 204*f*. The Cache Line Analyzer module 204*f* is an analysis module that is capable of decoding an address in the Data Entities 107 of the Entity Stream 108, and analyzing and classifying Data Entities 107 of the Entity Stream 108 according to the cache line that each cache miss corresponds to. Each Data Entity 107 is then passed to a Software Thread Analyzer module 204*g* which further classifies the information in the Data Entity 107 according to the software thread that caused the cache miss. Specifically, as discussed above, the Software Thread Analyzer module 204*g* decodes the register information in the Data Entity 107, and analyzes and classifies the information in the Data Entity 107 by software thread id. The Data Entity 107 is then passed to a Function Analyzer module 204*c* that decodes the instruction information in the Data Entity 107 and analyzes the instruction information by mapping it back to the source code function that the instruction information corresponds to. The Data Entity 107 is also passed to a Memory Segment Analyzer module 204*d* that decodes the address information in the Data Entity 107 and analyzes the virtual memory segment the address information belongs to. As a result, the Analyzer Modules (204*c*, 204*d*, 204*f*, 204*g*) of the Analysis Tree 203 illustrated in FIG. 3A are capable of producing analysis data in which each miss to a cache line is mapped to the software thread that caused the missed, and in which, for each software thread, the software function and the virtual memory segment that caused the miss to a particular cache line is identified.

Figure 3B:
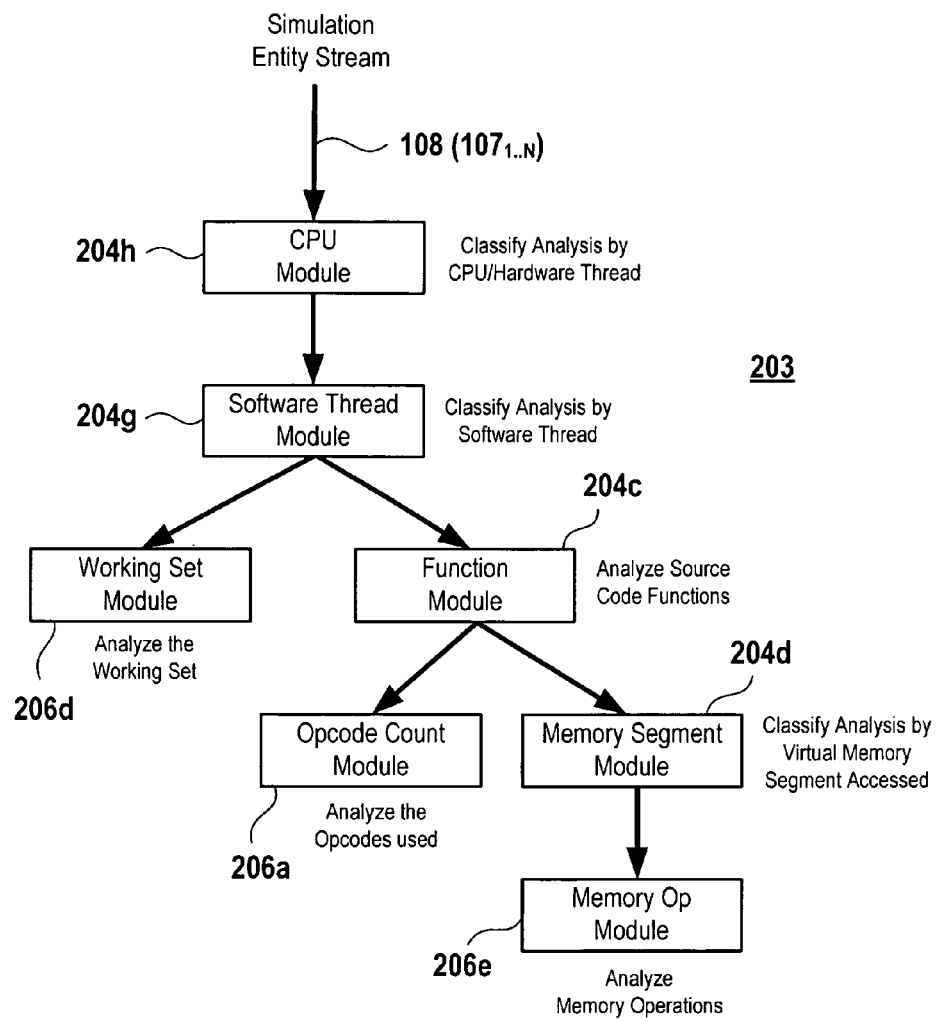
FIG. 3B is an illustration of an exemplary analysis tree for providing instruction fetch analysis of a hardware simulation, in accordance with an embodiment of the present invention.

In FIG. 3B, an illustration of a module configuration that can be used to analyze the instructions fetched in a hardware simulation is shown. In particular, Data Entities 107 of an Entity Stream 108 which are created during the cache miss events in the hardware simulation are passed to a CPU Analyzer module 204*h* which decodes the register information in each Data Entity 107, and analyzes and classifies the Data Entity 107 by CPU. Each Data Entity 107 is then passed to a Software Thread Analyzer module 204*g* that, as discussed above in FIG. 3A, decodes the register information in the Data Entity 107, and analyzes and classifies information in the Data Entity 107 by software thread id. Each Data Entity 107 is then passed to a Working Set Profiler module 206*d* (discussed above regarding FIG. 2) that decodes the instruction information in each Data Entity 107 and analyzes the working sets of the processes represented in the simulation Data Entity 107 and reports information about the growth of the working sets.

In another branch of analysis of FIG. 3B, each Data Entity 107 is also passed to a Function Analyzer module 204*c* (discussed above in FIG. 2) that decodes the address information in the Data Entity 107 and categorizes the information based on which source code function the address information maps to, and passes the Data Entity 107 on to an Opcode Count Profiler module 206*a* (discussed above in FIG. 2) and a Memory Segment Analyzer module 204*d* (also discussed above in FIG. 2). The Opcode Count Profiler 206*a* decodes the instruction information in the Data Entity 107 and counts the occurrence of each opcode. The Memory Segment Analyzer 204*d* analyzes the information in the Data Entity 107 according to which memory segments the information references, and passed the Data Entity 107 to a Memory Op Profiler 206*e* that decodes and analyzes the instruction information in the Data Entity 107 and reports the information for each memory operation identified in the Data Entity 107. Thus, as simulation Data Entities 107 created during instruction fetch events are propagated through the Analysis Tree 203 of FIG. 3B, the Data Entities 107 are analyzed on a per-CPU and a per-software thread basis. Then, the working sets corresponding to each software thread are analyzed and further broken down by the source code functions associated with a software thread and, for each software function, the opcodes and the virtual memory segments corresponding to the software function are analyzed. And finally, for each virtual memory segment the memory operations that the virtual memory segment performs are analyzed.

In view of the discussion above, it should be apparent that the object-oriented Workload Analysis Framework 104 of embodiments of the present invention can provide an environment in which Analyzer 204 and Profiler 206 modules can be reused and reconfigured. For instance, the Software Thread Analyzer 204g, the Function Analyzer 204c, the Memory Segment Analyzer 204d, the Opcode Count Profiler 206a, and the Working Set Profiler 206e modules which are used in FIG. 3A are reused in FIG. 3B by linking the modules in varying orders to represent a different type of analysis.

Moreover, in one embodiment of the present invention, an event framework can be implemented within the Workload Analysis Framework 104 that allows an Analysis Tree 203 to be dynamically reconfigured based on trigger events. In particular, each Analyzer 204 or Profiler 206 module can generate events that are predicated on specified trigger conditions, thereby dynamically enabling the performance of different types and depths of analysis in response to simulation events. For example, a trigger can be attached to a Software Thread Analyzer module 204g shown in FIG. 2 which activates if an address falls within two bounds etc. And an event handler registered with the trigger can then enable/disable etc. a Function Analyzer 204c branch of an Analysis Tree 203 so that more detailed analysis is performed only for addresses of interest. In other words, the Function Analyzer module 204c of FIG. 2 can dynamically clone a copy of its child Working Set Profiler module 206d for each new source code function that the Function Analyzer module 204c encounters. This feature allows the same Analysis Tree 203 to execute on a variety of Entity Stream 108 inputs without modifying the Analysis Tree 203.

This ability to dynamically reconfigure an Analysis Tree 203 based on trigger events provides a further advantage of mitigating the problems that are routinely encountered with large volumes of analysis data. Conventional post-processing and data exploration analysis tools are incapable of efficiently handling very large data sets. However, the Workload Analysis Framework 104 of embodiments of the present invention resolves this issue by allowing data reduction at the source of the hardware simulation environment using the mechanism of filtering data based on trigger events. For example, a module can trigger analysis when a "miss ratio" of a target process's memory segment reaches a predetermined threshold, which can significantly reduce the amount of analysis data that needs to be stored and post-processed.

Figure 4:
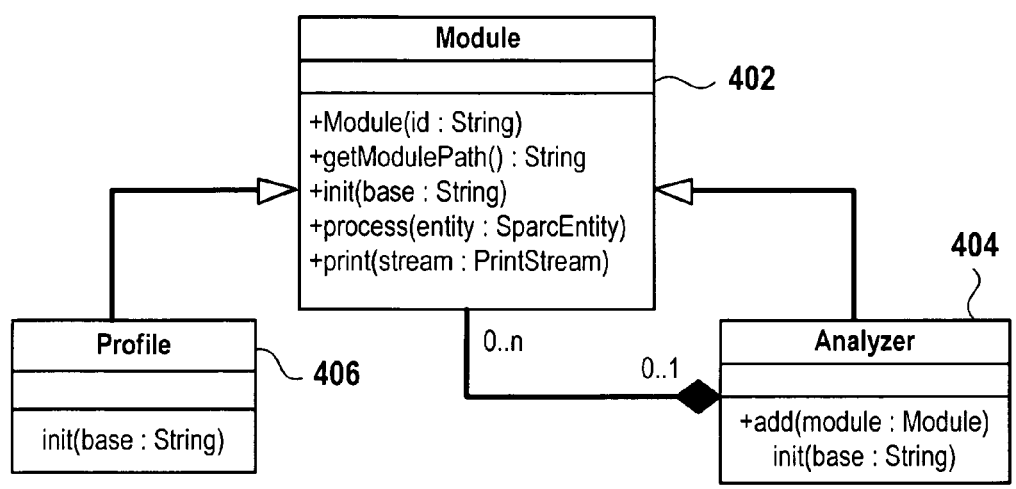
FIG. 4 is an illustration of a unified modeling language (UML) diagram of the analyzer and profile modules of the workload analysis framework, in accordance with an embodiment of the present invention.

In FIG. 4, in one embodiment of the present invention, the Analyzer 204 and Profiler 206 modules discussed above can be implemented as instances of a Java™-based abstract class called Module 402. More specifically, a Profiler subclass 406 and an Analyzer subclass 404 each extend the abstract class Module 402 to create Analyzer 204 and Profiler 206 objects. The Module abstract class 402 implements methods for naming a module using a string identifier and for getting the position of a module in the analysis tree. It also defines abstract methods (to be implemented in the Analyzer subclass 404 and Profiler subclass 406) for initializing module specific data fields and structures, processing a Data Entity 108 and printing out analysis results. Further, the Analyzer subclass 404 implements a method for adding other Modules 402 to it. Analyzers 404 can be composed of zero or many other Modules 402 that perform analysis on Data Entities 108 received by the Analyzer 404. However, a Module 402 may belong to one and only one Analyzer 404. Embodiments of the present invention are not limited to implementing the Analyzer 204 and the Profiler 206 modules using Java™-based class constructs, or to implementing the particular class construct shown in FIG. 4. Rather the Analyzers 204 and the Profilers 206 modules of embodiments of the present invention can be implemented using any programming construct including those provided in languages such as C, C++, Verilog, VHDL etc. and are not limited to languages that support object-oriented classes. By utilizing the object-oriented approach of embodiments of the present invention software experts can write analysis modules that can be used to analyze static traces or to be directly incorporated (unmodified) into live hardware performance simulation environments, which allows better sharing of analysis code, improves analysis turnaround time, and shortens the design improvement cycle for both software and hardware.

Moreover, Profilers 206 can be developed for specific analysis needs without requiring any knowledge about the Analyzers 204 to which the Profilers 206 are connected, and Profilers 206, as discussed above in FIG. 4, can automatically benefit from existing and future Analyzers 204 because higher level analysis methods such as function analysis, memory segment analysis etc. don't need to be implemented in the Profiler 206 itself. And when new Analyzers 204 are created an existing Profiler 206 could automatically perform new analysis using it.

Turning now to FIGS. 5 and 6, the Workload Analysis Framework 104 of embodiments of the present invention can be used to gather workload analysis information not only from static traces, but also from detailed performance simulators of emerging hardware architectures. In other words, the Workload Analysis Framework 104 of embodiments of the present invention is capable of utilizing hardware simulations which run in trace-driven mode or in execution-driven mode, or both.

Figure 5A:
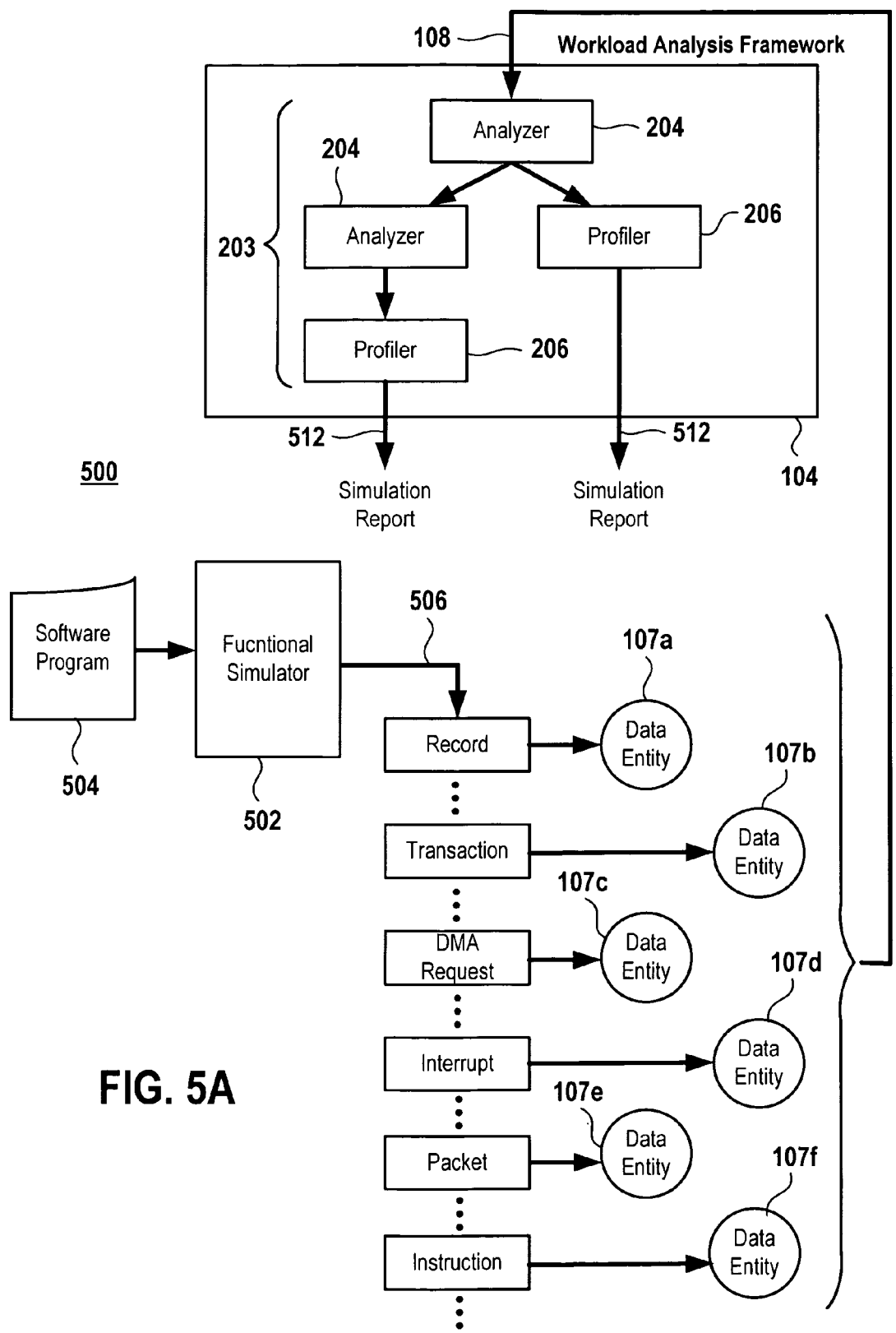
FIG. 5A is an illustration of an exemplary system for performing application-level analysis from a trace-driven hardware simulation, in accordance with an embodiment of the present invention.

In FIG. 5A, in one embodiment of the present invention, a System 500 for performing application-level analysis from a trace-driven hardware simulation is illustrated. The System 500 includes a Functional Simulator 502 that is capable of simulating emerging hardware architectures. The Functional Simulator 502 executes a Software Program 504 and outputs an instruction Trace 506 of records (e.g. register records, trap records, TLB records, cache forming records, etc.), bus transactions, direct memory access (DMA) requests, interrupts, network packets, instructions, etc. that represent a snapshot of all of the software and hardware activity and interaction that occurred during the Functional Simulator's 502 execution of the Software Program 504.

In one embodiment of the present invention, each instruction, record, bus transaction, DMA request, interrupt, network packet, etc. of the Trace 506, corresponds to a Data Entity 107 which can be implemented as an instance of a Java™ class called "entity," discussed above in FIG. 4.

Referring still to FIG. 5A, the Data Entities 107 discussed above are sent to the Workload Analysis Framework 104 as an Entity Stream 108 where, as discussed in FIGS. 2 and 3, the Workload Analysis Framework 104 of an embodiment of the present invention is capable of performing detailed application-level analysis on each Trace Data Entity 107 of the Entity Stream 108 by utilizing an Analysis Tree 203 of Analyzer 204 and Profiler 206 modules through which the Entity Stream 108 travels and is classified and analyzed or filtered at each level of the Analysis Tree 203 until the last Analyzer 204 module of each branch of the Analysis Tree 203 passes the last Data Entity 107 of the Entity Stream 108 to a Profiler 208 module which outputs the performance analysis results of the simulation Report(s) 512. In particular, in one embodiment of the present invention, as discussed above in FIG. 4, each Analyzer 204 and Profiler 206 module is capable of invoking a "process" operation that allows the Analyzer 204 or the Profiler 206 module to read the content of and analyze each Data Entity 107 which, as discussed above, can be implemented as a Java object represented by a class called "entity."

Figure 5B:
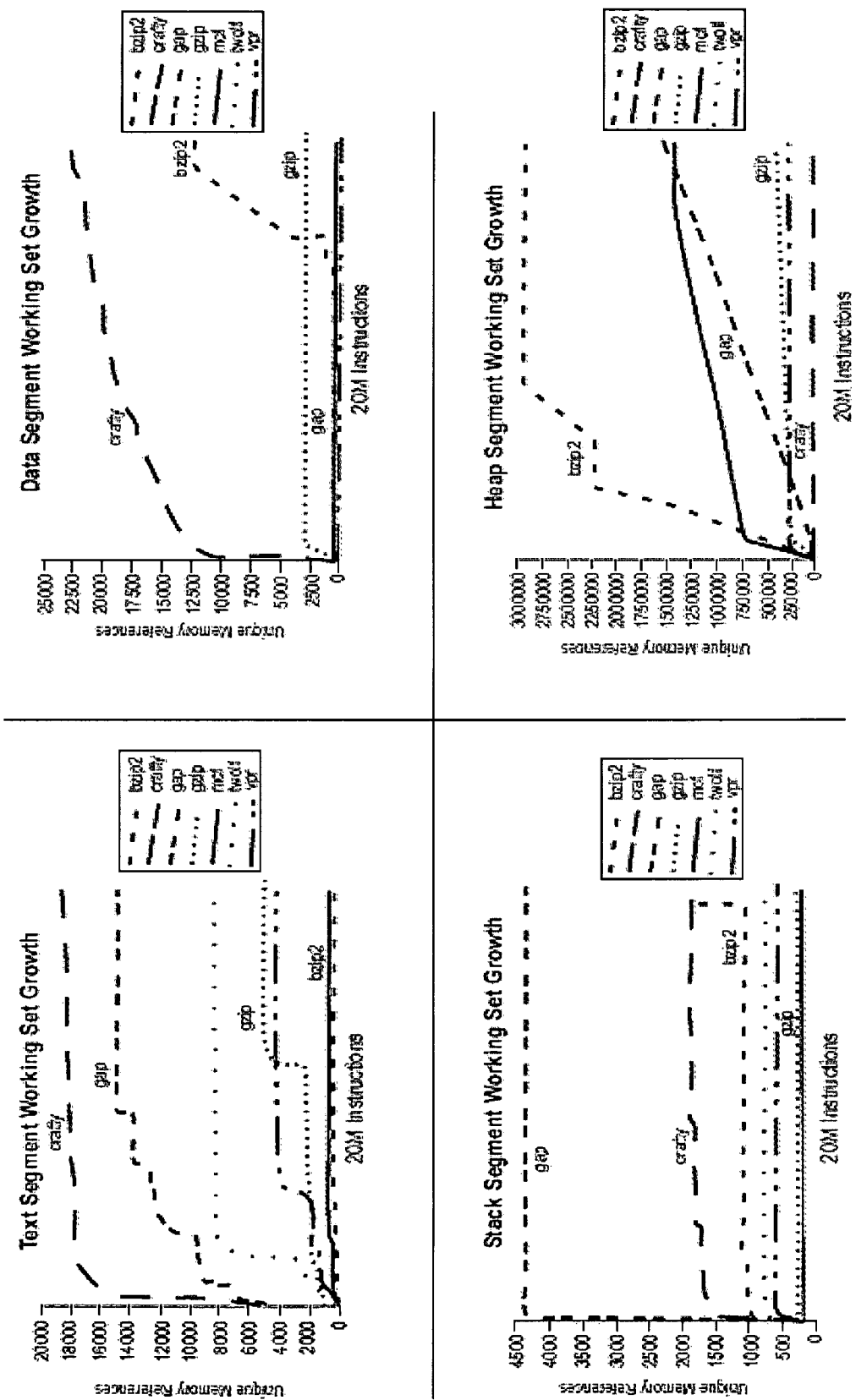
FIG. 5B is an illustration of an exemplary characterization of the segment working set growth analysis data produced by a workload analysis framework operating in a trace-driven simulation system, in accordance with an embodiment of the present invention.

In FIG. 5B, an exemplary characterization of the performance analysis data reported by a Workload Analysis Framework 104 in a trace-driven hardware simulation environment is provided. Specifically, FIG. 5B illustrates the results of a per-memory segment (e.g., application binary text, application binary data, heap space, and process stack memory segments of a virtual address space of a Solaris™ process etc.) working set trace analysis using the Standard Analyzer 204a, Memory Segment Analyzer 204d, and Working Set Profiler 206d branch of Analysis Tree 203 illustrated in FIG. 2 for several of the integer benchmarks of the Standard Performance Evaluation Corporation (SPEC) CPU2000 suite. The performance analysis results illustrated in FIG. 5B show that the data, the heap, and the stack memory segments display different growth patterns that would not be discernable if the growth patterns were analyzed as a combined group. For example, the "crafty" benchmark does not display significant heap growth, but does steadily access new words in the data segment. Typically, most benchmarks demonstrate stepwise growth in their text working set, but the benchmark's stack sizes remain steady. This indicates that even though new code paths continue to be executed, maximum function call depth is reached very early. Additionally, of all of the benchmarks, the "gap" benchmark displays the longest function call chain while the "crafty" benchmark shows the largest text footprint. The performance analysis data of FIG. 5B also illustrates that even though the "bzip2" and the "gzip" benchmarks are in the same benchmark category (e.g. compression), their characteristics differ—bzip2 uses a larger heap and data segment than gzip and, though bzip2 displays phased behavior in the growth of the memory segments, gzip reaches steady state quickly.

Based on the FIG. 5B discussion above, it is apparent that the Workload Analysis Framework 104 of embodiments of the present invention can be used to analyze memory access patterns of both commercial and scientific workloads and to gather statistics about workload traces that can be used by product design groups. And, as shown in FIG. 5B, these types of statistics can be used to verify that Traces 506 generated through a functional simulation accurately represent a workload execution on real hardware and to capture interesting or representative segments of a workload execution.

Figure 6A:
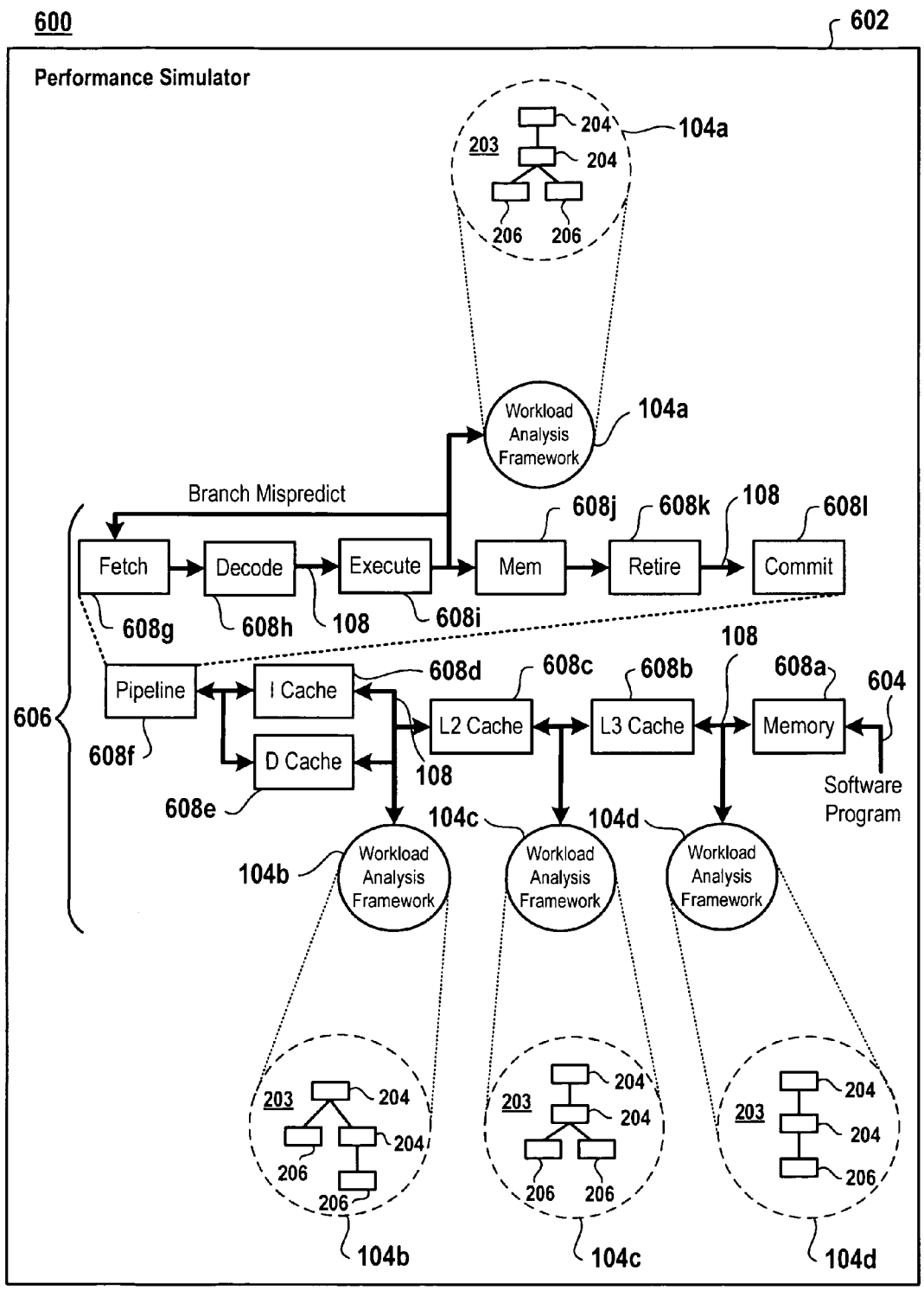
FIG. 6A is an illustration of an exemplary system for performing application-level analysis from an execution-driven hardware simulation, in accordance with an embodiment of the present invention.

Turning now to FIG. 6A, an exemplary System 600 for performing application-level analysis from an execution-driven or live hardware simulation is illustrated. In one embodiment of the present invention, the exemplary System 600 can include one or more instances a Workload Analysis Framework (e.g., 104a, 104b, 104c, 104d) which are selectively plugged into a multi-stage execution Pipeline 606 of a Performance Simulator 602 that performs performance model simulation of emerging or existing hardware architectures. In one embodiment of the present invention, each instance of the Workload Analysis Framework (104a, 104b, 104c, 104d) includes an Analysis Tree 203 that can use any combination of interchangeable Analyzers 204 and Profiles 206 to perform performance analysis on the chip or system architecture simulated by the Performance Simulator 602.

In the System 600, the Performance Simulator 602 executes a Software Program 604 and produces an Entity Stream 108 which is a stream of Data Entities 107 (not shown) that, as discussed above in FIG. 6, can each be implemented as a Java object represented by a class called "entity" and each represent records (e.g. register records, trap records, TLB records, cache forming records, etc.), bus transactions, direct memory access (DMA) requests, interrupts, network packets, or instructions, etc. of all of the software and hardware activity and interaction that occurred during the Performance Simulator's 602 execution of the Software Program 604. During execution of the Software program 604, the Entity Stream 108 flows between Blocks 608 of the Pipeline 606. FIG. 6 demonstrates how the Workload Analysis Framework (104a, 104b, 104c, 104d) can be hooked into a generic processor pipeline made of several blocks or stages, which include, but are not limited to, Fetch Block 608g (pipeline stage or stages during which instruction fetch occurs), Decode Block 608h (pipeline stage or stages during which instruction decode occurs), Execute Block 608i (pipeline stage or stages during which instruction execution occurs), Memory Block 608j (pipeline stage or stages during which data memory accesses occur to the memory system), Retire Block 608k (pipeline stage or stages during which instruction retire occurs), and Commit Block 6081 (pipeline stage or stages during which instruction commit occurs). In addition, the Workload Analysis Framework (104a, 104b, 104c, 104d) hooks similarly into different levels of the cache memory hierarchy (608a, 608b, 608c, 608d). Instances of the Workload Analysis Framework (104a, 104b, 104c, 104d) "snoop" the Stream 108 of Data Entities 107 flowing between Blocks 608 of the Pipeline 606 and perform analysis without impacting or modification to the simulation itself.

For example, the exemplary System 600 of FIG. 6A can be configured such that instances of the Workload Analysis Framework (104a, 104b, 104c, 104d) each include an Analysis Tree 203 that contains a Function Analyzer 204 module which is connected to a simple Instruction Frequency Profiler 206 module. And Workload Analysis Framework instance 104a, which is plugged in between Execute Block 608i and Mem Block 608j, can characterize branch mispredicts encountered in the Entity Stream 108, and Workload Framework instances 104b, 104c, and 104d, which are respectively plugged in between Instruction Cache Block 608d and Data Cache Block 608e, L2 Cache Block 608c, L3 Cache Block 608b, and Memory Block 608a, can characterize misses from each level of cache. As a result, these characterizations can generate function-level pipeline analysis data like that shown in FIG. 6B, where the left-most bars show the instruction distribution among the most frequently executed function and the remaining sets of bars show each function's contribution to the total instruction cache misses, data cache misses, L2 cache misses, L3 cache misses, and branch mispredicts.

FIG. 6B highlights the capability of the Workloadload Analysis Framework 104 of embodiments of the present invention to map important processor events back to the software source code. For example, FIG. 6B shows the most frequently executed source code functions for each benchmark and the percentage of cache misses and branch mispredicts caused by each of those functions in simulation. Looking at this type of hardware performance data from a software perspective exposes additional information that easily could have been hidden through conventional hardware analysis. For example, the software function "primal_start_artifical( )" in the "mcf" benchmark might otherwise be viewed as insignificant, accounting for only approximately 1% of user instructions. However, the characterizations of the "primal_start_artifical" function using a Workload Analysis Framework 104 of an embodiment of the present invention like that that illustrated in FIG. 6A demonstrate that the function actually causes >90% of the L3 cache misses detected in the simulation, which is a potentially significant bottleneck. Similar examples can be observed with the "bzip2" benchmark, where the "sortIt( )" function comprises only 14% of the instructions, yet the same function causes most of the memory traffic, and with the "mcf" benchmark, where the "primal_bea_mpp( )" function is only 12% of the instruction yet causes >50% of the branch mispredicts.

However, it is important to note that the Workload Analysis Framework 104 of embodiments of the present invention is not limited to producing only the types of performance analysis data discussed above in FIGS. 1 through 6. For example, in an alternate embodiment of the present invention, the Workload Analysis Framework 104 is capable of producing analysis data that can be leveraged for purposes of exploring synthetic workload inputs for wide processor and system design where trace-driven and execution-driven simulation methods can sometimes become impractical.

In view of the discussion above, it will become apparent that the type of analysis data provided by the Workload Analysis Framework 104 of embodiments of the present invention can allow, among things, hardware architects to understand and identify the types of software functions that behave poorly in different portions of a hardware system and to learn how proposed changes to the software and hardware design will affect benchmark behavior. The Workload Analysis Framework 104 of embodiments of the present invention also allows software architects to perform application tuning for emerging hardware architectures at a much earlier stage in the design cycle, which provides the software architects with more opportunity to influence the design of hardware systems.

Moreover, in view of the discussion above, the Workload Analysis Framework 104 of embodiments of the present invention is based on an object-oriented infrastructure which provides a unique and modular framework for performance analysis in trace and execution etc. driven simulation environments. In particular, the Workload Analysis Framework 104 allows analysis modules (analyzers and profilers) to be written in isolation of other simulation-specific etc. modules with no knowledge of the overall simulator architecture. The Workload Analysis Framework 104 of embodiments of the present invention also enables engineers and architects to leverage existing analysis modules without any insight into the existing module's implementation. As a result, productivity can be improved by reducing the time usually required for hardware and software development, and for providing valuable analysis data.

Additionally, the modular architecture of the Workload Analysis Framework 104 provides software engineers with a capability to provide analysis routines that attach to the Workload Analysis Framework 104 that is specific to a small piece of their software application without requiring knowledge of the larger simulation environment. In other words, when using conventional hardware simulation approaches it can take months to produce adequate analysis results because hardware simulation experts have to modify their simulation environments to accommodate the requirements of software experts. Whereas, by using the Workload Analysis Framework 104 of embodiments of the present invention, detailed analysis result can be obtained in a matter of minutes.

Furthermore, developing new types of analysis is easier and faster because of the modularity of the Workload Analysis Framework 104 tool. For example, an analysis tree that performs complex analysis on a memory segment basis can be modified to perform analysis on a source code function basis by simply replacing a Memory Segment Analyzer module of the analysis tree with a Function Analyzer module, while keeping the other analysis modules the same.

Figure 7A:
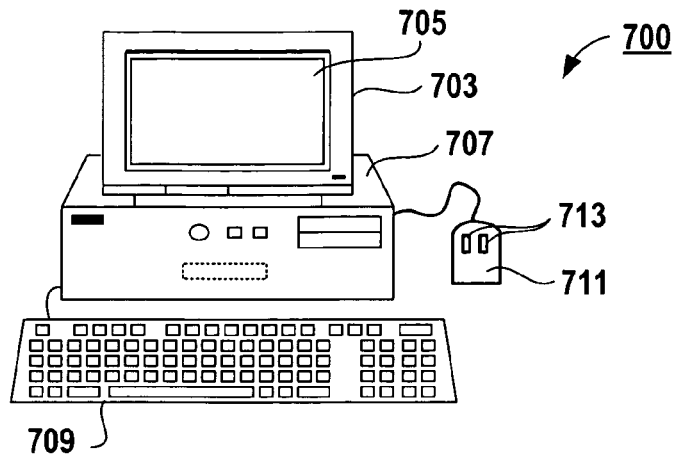
FIG. 7A is a generalized diagram of a typical computer system suitable for use with the present invention.

In FIG. 7A, is an illustration of an embodiment of an exemplary computer system 700 suitable for use with the present invention including display 703 having display screen 705. Cabinet 707 houses standard computer components (not shown) such as a disk drive, CDROM drive, display adapter, network card, random access memory (RAM), central processing unit (CPU), and other components, subsystems and devices. User input devices such as a mouse 711 having buttons 713, and keyboard 709 are shown.

Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 7B:
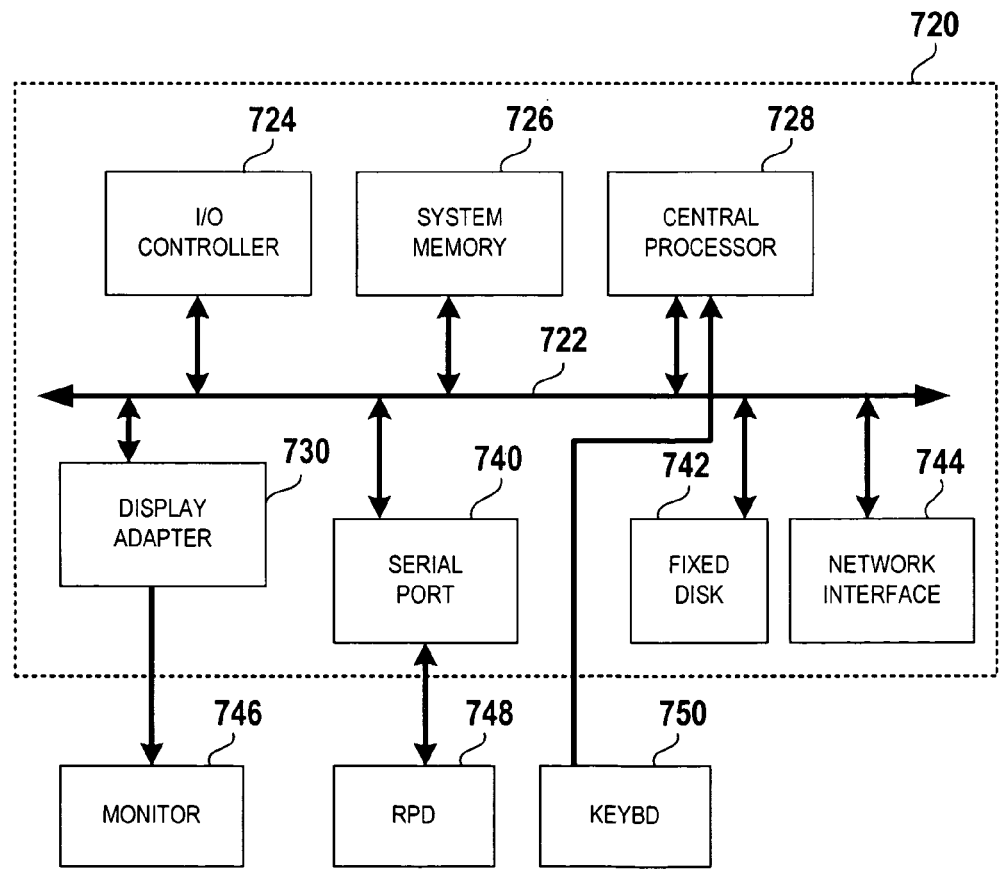
FIG. 7B shows subsystems in the typical computer system of FIG. 7A.

FIG. 7B illustrates subsystems that might typically be found in a computer such as computer 700. In FIG. 7B, subsystems within box 720 are directly interfaced to internal bus 722. Such subsystems typically are contained within the computer system such as within cabinet 707 of FIG. 7A. Subsystems include input/output (I/O) controller 724, System Random Access Memory 9RAM) 726, Central Processing Unit (CPU) 728, Display Adapter 730, Serial Port 740, Fixed Disk 742 and Network Interface Adapter 744. The use of bus 722 allows each of the subsystems to transfer data among the subsystems and, most importantly, with the CPU. External devices can communicate with the CPU or other subsystems via the bus 722 by interfacing with a subsystem on the bus. Monitor 746 connects to the bus through Display Adapter 730. A relative pointing device (RPD) 748 such as a mouse connects through Serial Port 740. Some devices such as a Keyboard 750 can communicate with the CPU by direct means without using the main data bus as, for example, via an interrupt controller and associated registers (not shown).

As with the external physical configuration shown in FIG. 7A, many subsystem configurations are possible. FIG. 7B is illustrative of but one suitable configuration. Subsystems, components or devices other than those shown in FIG. 7B can be added. A suitable computer system can be achieved without using all of the subsystems shown in FIG. 7B. For example, a standalone computer need not be coupled to a network so Network Interface 744 would not be required. Other subsystems such as a CDROM drive, graphics accelerator, etc. can be included in the configuration without affecting the performance of the system of the present invention.

Figure 7C:
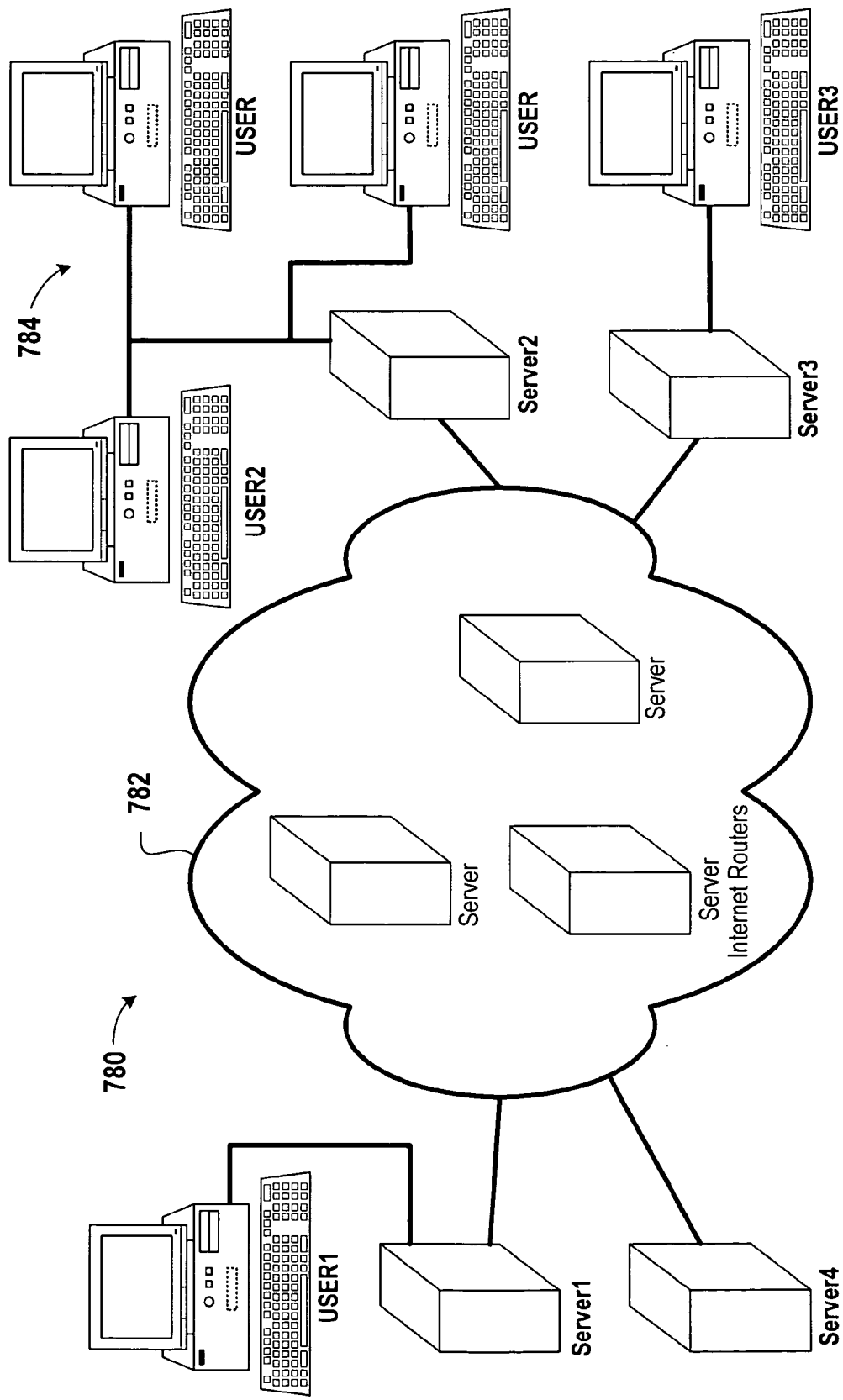
FIG. 7C is a generalized diagram of a typical network suitable for use with the present invention.

FIG. 7C is a generalized diagram of a typical network. In FIG. 7C, the network system 780 includes several local networks coupled to the Internet. Although specific network protocols, physical layers, topologies, and other network properties are presented herein, embodiments of the present invention are suitable for use with any network.

In FIG. 7C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of sever routers 782. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 784 are shown utilizing a local network at a different location from USER1 computer. The computers at 784 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically though of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, or semiconductor system, apparatus, system, device, or computer memory. The computer readable medium may have suitable instructions for synchronously presenting multiple video program ID streams, such as on a display screen, or for providing for input or presenting in accordance with various embodiments of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer system for performing application-level analysis of simulated hardware on a processor of the computer system, comprising:
    a hardware simulator, wherein the hardware simulator is capable of executing software on the simulated hardware and intercepting interactions between the software and the simulated hardware; and
    a framework, wherein the framework includes a plurality of analysis modules arranged in a multi-level configuration through which a data stream of one or more data entities corresponding to the interactions between the software and the simulated hardware travels and is processed at each level of the multi-level configuration, the multi-level configuration of the plurality of analysis modules defining an analysis tree with nodes, wherein a root node of the analysis tree is represented by a parent analysis module and each node originating from the root node is represented by a child analysis module, the analysis tree providing hierarchical analysis of data stream, wherein the framework allows dynamic reconfiguration of the plurality of analysis modules within the analysis tree as the one or more data entities travel through the framework, the one or more of the plurality of analysis modules within the analysis tree configured to dynamically filter the data stream by dividing the data stream into a plurality of data sub-streams, wherein each data sub-stream is directed to a respective analysis module for processing based on one or more characteristics associated with the data sub-streams, the one or more of the plurality of analysis modules further configured to dynamically perform one or more of classification, annotation or transformation of the one or more of the plurality of data sub-streams during execution of the software, wherein each of the plurality of analysis modules is dynamically interchangeable to generate a reconfigured framework, the dynamic interchanging includes dynamic cloning of the child analysis module corresponding to a particular analysis module within the analysis tree upon detection of a new source code function, the reconfigured framework updated with the cloned child analysis module is used in performing different types and depths of analysis.

2. The system as recited in claim 1, wherein the hardware simulator is one of a functional simulator, a performance simulator, or a functional simulator and a performance simulator.

3. The system as recited in claim 2, wherein the functional simulator is capable of operating in a trace-driven mode and generating a static trace, the static trace capturing the interactions between the software and the simulated hardware, wherein each of the one or more data entities of the data stream is generated from the static trace.

4. The system as recited in claim 2, wherein the performance simulator is capable of operating in an execution-driven mode.

5. The system as recited in claim 2, wherein the performance simulator includes an execution pipeline, the execution pipeline corresponding to a design of the simulated hardware.

6. The system as recited in claim 5, wherein the execution pipeline is a multi-stage execution pipeline including a plurality of blocks, each block corresponding to a stage of the multi-stage execution pipeline, and wherein during execution of the software the data stream flows between the plurality of blocks.

7. The system as recited in claim 6, wherein the system includes multiple instances of the framework, and wherein each instance of the framework is selectively plugged in between two blocks of the plurality of blocks, each instance of the framework being capable of processing the data stream traveling between the two blocks.

8. The system as recited in claim 1, wherein the framework is an object-oriented framework.

9. The system as recited in claim 1, wherein each of the plurality of analysis modules is interchangeable based on one or more trigger events generated by the plurality of analysis modules, the one or more trigger events predicated on specified trigger conditions.

10. The system as recited in claim 1, wherein one or more of the analysis modules is an analyzer module, each analyzer module being capable of classifying, annotating, or transforming the one or more data entities captured in the data stream, for processing by a lower-level analysis module of the multi-level configuration, and wherein one or more of the analysis modules is a profiler module, the profiler module being capable of profiling the one or more data entities captured in the data stream.

11. The system as recited in claim 10, wherein the lower-level analysis module is a child analyzer module having a parent analyzer module in the multi-level configuration or the lower-level analysis module is a child profiler module having a parent analyzer module in the multi-level configuration.

12. A computer implemented method for enabling a computer system to perform application-level analysis of simulated hardware, the method comprising:

executing software on the simulated hardware using a hardware simulator; intercepting interactions between the software and the simulated hardware;

receiving a data stream of one or more data entities corresponding to the interactions between the software and the simulated hardware at a framework, the framework including a plurality of analysis modules arranged in a multi-level configuration, wherein the multi-level configuration of the plurality of analysis modules defining an analysis tree with nodes, wherein a root node of the analysis tree is represented by a parent analysis module and each node originating from the root node is represented by a child analysis module, wherein the framework allows dynamic reconfiguration of the plurality of analysis modules within the analysis tree to generate a reconfigured framework based on trigger events generated at the one or more analysis modules in response to specific trigger conditions at the one or more data entities as the one or more data entities travel through the framework, the reconfigured framework used in performing different types and depths of analysis, the one or more of the plurality of analysis modules configured to dynamically filter the data stream by dividing the data stream into a plurality of data sub-streams, wherein each data sub-stream having at least one data entity is directed to a respective analysis module for processing based on one or more characteristics associated with the data sub-streams, the one or more of the plurality of analysis modules further configured to dynamically perform one or more of classification, annotation or transformation of the one or more of the plurality of data sub-streams during execution of the software; and processing the one or more data entities associated with the data sub-streams, at each level of the multi-level configuration, using the plurality of analysis modules as the data stream travels through the multi-level configuration, the analysis tree providing hierarchical analysis of data stream, the one or more analysis modules of the analysis tree adding one or more information objects to the data stream for analysis as the data stream travels down the analysis modules in the analysis tree, wherein the dynamic reconfiguration further includes, upon detection of a new source code function in the received data stream at a particular analysis module within the analysis tree, dynamically cloning the child analysis module corresponding to the particular analysis module, the cloned child analysis module updated to the framework to process the new source code function.

13. The method as recited in claim 12, further comprising:
generating multiple instances of the framework;
selectively plugging each instance of the framework into a multi-stage pipeline of the hardware simulator, wherein each instance of the framework is capable of independently processing the one or more data entities of the data stream traveling between blocks of the multi-stage pipeline, each block corresponding to an execution stage of the multi-stage pipeline.

14. The method as recited in claim 13, wherein the hardware simulator is an execution-driven performance simulator.

15. The method as recited in claim 12, wherein dynamically interchanging plurality of analysis modules further includes, identifying one or more trigger events generated by the plurality of analysis modules, the one or more trigger events predicated on specified trigger conditions; and dynamically reconfiguring plurality of analysis modules based on the trigger events triggered by one or more data entities of the data stream.

16. The method as recited in claim 12, wherein one or more of the analysis modules is an analyzer module, each analyzer module being capable of classifying, annotating, or transforming the one or more data entities captured in the data stream for processing by a lower-level analysis module of the multi-level configuration, and wherein one or more of the analysis modules is a profiler module, each profiler module being capable of profiling the one or more data entities captured in the data stream.

17. The method as recited in claim 12, wherein the lower-level analysis module is a child analyzer module having a parent analyzer module in the multi-level configuration or the lower-level analysis module is a child profiler module having a parent analyzer module in the multi-level configuration.

18. The method as recited in claim 12, wherein the hardware simulator is a trace-driven functional simulator, the trace-driven functional simulator being capable of generating a static trace, wherein each of the one or more data entities of the data stream is generated from the static trace.

19. A computer-readable medium having computer-implemented instructions, the instructions when executed by a computer system enables directing the computer system to perform application-level analysis of simulated hardware, the computer readable medium comprising:

instructions for receiving a data stream of one or more data entities corresponding to interactions between software and the simulated hardware at a framework, the framework including a plurality of analysis modules arranged in a multi-level configuration, wherein the multi-level configuration of the plurality of analysis modules defining an analysis tree with nodes, wherein a root node of the analysis tree is represented by a parent analysis module and each node originating from the root node is represented by a child analysis module, wherein the framework allows dynamic reconfiguration of the plurality of analysis modules within the analysis tree to generate a reconfigured framework based on trigger events generated at the one or more analysis modules in response to specific trigger conditions at the one or more data entities as the one or more data entities travel through the framework, the reconfigured framework used in performing different types and depths of analysis, the one or more of the plurality of analysis modules configured to dynamically filter the data stream by dividing the data stream into a plurality of data sub-streams, wherein each data sub-stream having at least one data entity is directed to a respective analysis module for processing based on one or more characteristics associated with the data sub-streams, the one or more of the plurality of analysis modules further configured to dynamically perform one or more of classification, annotation or transformation of the one or more of the plurality of data sub-streams during execution of the software; and instructions for processing the one or more data entities associated with the data sub-streams, at each level of the multi-level configuration, using the plurality of analysis modules as the data stream travels through the multi-level configuration, the analysis tree providing hierarchical analysis of data stream, the one or more analysis modules of the analysis tree adding one or more information objects to the data stream for analysis as the data stream travels down the analysis modules in the analysis tree, wherein the dynamic reconfiguration further includes, upon detection of a new source code function in the received data stream at a particular analysis module within the analysis tree, dynamically cloning the child analysis module corresponding to the particular analysis module, the cloned child analysis module updated to the framework to process the new source code function.

* * * * *